(12) United States Patent
Blumenfeld et al.

(10) Patent No.: US 11,750,636 B1
(45) Date of Patent: Sep. 5, 2023

(54) EXPRESSION ANALYSIS FOR PREVENTING CYBERATTACKS

(71) Applicant: Two Six Labs, LLC, Arlington, VA (US)

(72) Inventors: Ian T. Blumenfeld, Arlington, VA (US); David Renardy, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 333 days.

(21) Appl. No.: 17/092,809

(22) Filed: Nov. 9, 2020

(51) Int. Cl.
*H04L 9/40* (2022.01)

(52) U.S. Cl.
CPC ...... *H04L 63/1433* (2013.01); *H04L 63/1425* (2013.01); *H04L 63/1458* (2013.01)

(58) Field of Classification Search
CPC ............ H04L 63/1433; H04L 63/1425; H04L 63/1458
See application file for complete search history.

(56) References Cited

U.S. PATENT DOCUMENTS

| | | | | |
|---|---|---|---|---|
| 8,347,384 B1* | 1/2013 | Preston | ............... | H04L 67/1097 726/23 |
| 8,751,466 B1* | 6/2014 | Tsay | ............... | G06F 16/951 707/700 |
| 9,398,033 B2* | 7/2016 | Goyal | ............... | H04L 63/168 |
| 10,454,968 B1* | 10/2019 | Bortz | ............... | H04L 63/1441 |
| 11,070,573 B1* | 7/2021 | Edwards | ............... | G06F 21/552 |
| 2008/0034427 A1* | 2/2008 | Cadambi | ............... | H04L 63/1425 726/22 |
| 2008/0307524 A1* | 12/2008 | Singh | ............... | H04L 63/1416 726/22 |
| 2009/0262659 A1* | 10/2009 | Sturges | ............... | H04L 63/1416 370/253 |
| 2009/0265786 A1* | 10/2009 | Xie | ............... | H04L 63/1441 726/24 |
| 2010/0146623 A1* | 6/2010 | Namjoshi | ............... | H04L 63/0263 726/23 |

(Continued)

OTHER PUBLICATIONS

Kirrage et al., Static Analysis for Regular Expression Denial-of-Service Attacks, 2013, Springer, Network and System Security. NSS 2013. Lecture Notes in Computer Science, vol. 7873., p. 1-13 (Year: 2013).*

(Continued)

*Primary Examiner* — Stephen T Gundry
(74) *Attorney, Agent, or Firm* — Armis IP Law, LLC

(57) ABSTRACT

A method for assessing a regular expression for vulnerability to ReDoS attacks includes receiving a regular expression for evaluating a string defined by ordered set of characters from an alphanumeric input device, and evaluating the regular expression for determining if a parsing operation of the string according to the regular expression results in a disproportionate resource consumption. The evaluation determines if the resource consumption constitutes a Regular expression Denial of Service (ReDoS) attack by providing a vulnerability indication of a single valid attack string, rather than attempting to find all possible attack strings. The valid attack string is defined by an input string for which evaluation based on the regular expression would result in disproportionate resource consumption.

18 Claims, 5 Drawing Sheets

(56) References Cited

U.S. PATENT DOCUMENTS

| | | | | |
|---|---|---|---|---|
| 2011/0093496 | A1* | 4/2011 | Bando | G06F 16/90344 |
| | | | | 707/769 |
| 2011/0283360 | A1* | 11/2011 | Abadi | H04L 63/1416 |
| | | | | 726/24 |
| 2012/0110003 | A1* | 5/2012 | Brewer | G06F 16/90344 |
| | | | | 707/769 |
| 2012/0221497 | A1* | 8/2012 | Goyal | H04L 63/1416 |
| | | | | 706/12 |
| 2012/0331007 | A1* | 12/2012 | Billa | G06F 16/9024 |
| | | | | 707/E17.012 |
| 2012/0331554 | A1* | 12/2012 | Goyal | H04L 69/22 |
| | | | | 726/23 |
| 2018/0367557 | A1* | 12/2018 | Brown | G06F 16/90335 |
| 2019/0222558 | A1* | 7/2019 | Kahn | H04L 63/0236 |
| 2019/0303796 | A1* | 10/2019 | Balasubramanian | G06N 7/01 |
| 2019/0384783 | A1* | 12/2019 | Malak | G06F 40/146 |
| 2020/0067861 | A1* | 2/2020 | Leddy | G06F 21/6245 |
| 2020/0320068 | A1* | 10/2020 | Malak | G06F 16/26 |
| 2020/0327225 | A1* | 10/2020 | Nguyen | G06N 3/044 |
| 2021/0073004 | A1* | 3/2021 | Glendenning | G06F 8/31 |
| 2021/0191717 | A1* | 6/2021 | Mayer | G06F 8/34 |
| 2022/0382882 | A1* | 12/2022 | Gokhman | G06F 21/577 |

OTHER PUBLICATIONS

Barrett, et al. "The SMT-LIB Standard"—Version 2.0, 2010, pp. 1-10.
Wustholz, et al., "Static Detection of DoS Vulnerabilities in Programs that use Regular Expressions (Extended Version)" Jan. 15, 2017, pp. 1-26.

* cited by examiner

^([a-zA-Z0-9])(([\-.][_]+)?([a-zA-Z0-9]+))*(@){1}[a-z0-9]+[.]{1}(([a-z]{2,3})|([a-z]{2,3}[.]{1}[a-z]{2,3}))$ 720-1 —— 1. [a-zA-Z)-9]+
720-2 —— 2. (([\-.][_]+)?([a-zA-Z0-9]+))*

EXPRESSION ANALYSIS FOR PREVENTING CYBERATTACKS

STATEMENT REGARDING FEDERALLY SPONSORED RESEARCH AND DEVELOPMENT

This invention was made with government support under contract No. SPONSOR W56KGY-16-D-0041 awarded by the United States Government. The Government has certain rights in the invention.

BACKGROUND

Cybersecurity has evolved as a measure of ensuring that computer based information systems are not compromised. While much of cyber crime pertains to divulgence of sensitive information stored in computer systems, threats that result in the availability of a system can be harmful as well. Often called Denial of Service (DoS) attacks, such actions seek to monopolize computer resources, typically by invoking the CPU (Central Processing Unit) on one task or instruction sequence to the exclusion of others so that the computer is effectively slowed to the point of unusability. Other attacks may focus on the I/O system, effectively occupying a mass storage device such as a disk or SSD (Solid State Disk) such that other instruction sets or programs may not access it.

Parsing is a common operation which scans or traverses a sequence of values. String parsing refers to scanning a list of alphanumeric characters such as ASCII (American Standard Code for Information Interchange), as often input by a human interface device such as a keyboard. Acceptable or expected character inputs for an input string are often defined as a regular expression. Since the input to a regular expression emanates from an external human or network actor, unvalidated input to a regular expression can result in a Regular Expression Denial of Service (ReDoS) attack.

A regular expression or "regex" (also "RegEx") is a sequence of characters that define a search pattern. Regexs are widely used in modern computing for pattern matching, including in format checking (e.g. that a string is a valid email address), "find and replace" features, and in reviewing content for malicious patterns such as in anti-virus, web application firewalls, or network intrusion detection systems.

SUMMARY

In a computer system, a method for assessing a regular expression for vulnerability to ReDoS attacks includes receiving a regular expression for evaluating a string defined by ordered set of characters from an alphanumeric input device, and evaluating the regular expression for determining if a parsing operation of the string according to the regular expression results in a disproportionate resource consumption. The evaluation determines if the resource consumption constitutes a Regular expression Denial of Service (ReDoS) attack, and if so, renders an indication of the vulnerability of the regular expression.

ReDoS is an algorithmic complexity attack against regular expression matching. In a ReDoS attack, an adversary submits a string that causes a regex matching algorithm to do quadratic, or even exponential work, relative to the length of the input. Since many applications rely on regular expressions, testing them for ReDoS vulnerabilities may be significant. For example. in 2016, a ReDoS attack on a regular expression used as part of whitespace trimming caused Stack Exchange to be unreachable for some time.

Configurations herein are based, in part, on the observation that regular expressions are often employed to evaluate free form strings received from an unknown and possibly detrimental source. Such strings may be part of an open response such that the regular expression is the initial validation and no previous validation or input sufficiency checks have been performed. In a free response user input string, this presents a vulnerability to such a ReDoS attack perpetuated through an input string that will result in runaway or excessively cyclic processing. While methods have been proposed to analyze a RegEx for potential vulnerability, conventional approaches to regular expression analysis unfortunately employ an exhaustive validation that purports to find every instance of a problematic string that could cause runaway behavior.

Accordingly, configurations herein substantially overcome the above-described shortcomings of conventional RegEx analysis by providing a vulnerability indication of a single valid attack string, rather than a solution that attempts to find all possible attack strings. The valid attack string is defined by an input string for which evaluation based on the regular expression would result in disproportionate resource consumption, and the disclosed approach identifies the valid attack string prior to performing an exhaustive traversal of potential attack strings.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
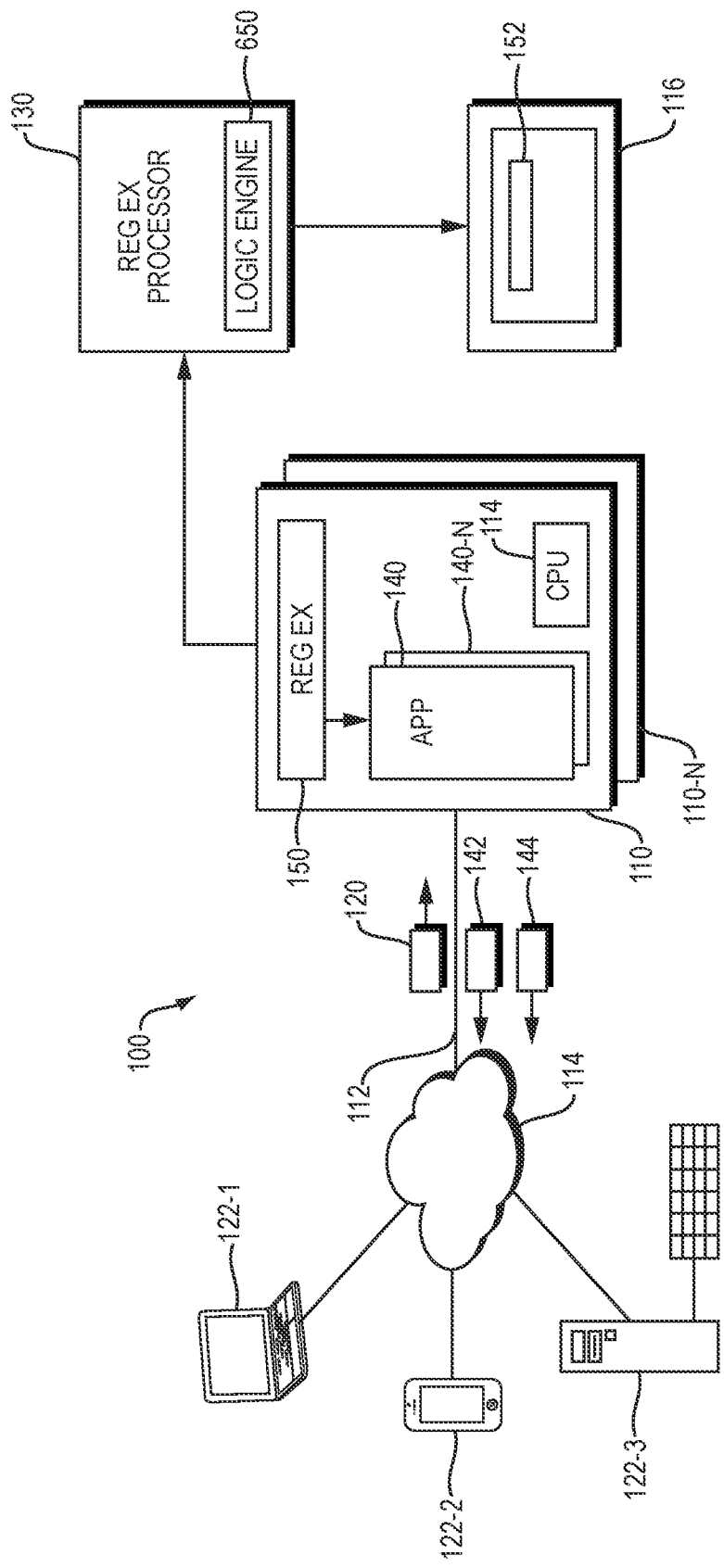
FIG. 1 is a context diagram of an information processing environment suitable for use with configurations herein.

Regular expressions define a syntax of a string of characters according to a set of rules that dictate an ordering and value of characters that appear in an input string. Evaluation of the input string for compliance with the RegEx involves a parsing operation that walks or traverses the input string to identify agreement or violation of the prescribed syntax. A RegEx is often represented as a graph of states, where each node is a state having edges to represent a transition to a successive node based on a parsed value (character) in the input string. Traversal of the graph based on successive characters in the input string leads to a success or failure for satisfying the regular expression. In computer science terms, such graphs are referred to as a Finite Automata, and traversal involves walking a path along the nodes. A ReDoS attack as defined herein occurs when a state transition results in a number of paths increasing in an exponential or polynomial (quadratic) manner based on a recursive or infinite transition.

One of the strengths of regular expressions as a string evaluation and matching tool is an ability to embed nesting and repetition, through symbols often referred to as "wildcards" and "placeholders" which represent a number of possible characters. Regular expressions therefore allow for complex pattern descriptions, including those that allow repetition of sub patterns. For example, the "+" operator in the Perl Compatible Regular Expression (PCRE) format matches on a sub pattern, followed by any number of repetitions of that sub pattern. For example, the PCRE regex "a+" will match on the string "a" as well as the string "aa", "aaa", etc. Other regular expression syntactical models are known, and have similar capabilities.

Regular expressions can lead to computational complexity in evaluation. Take for example the regular expression "(a+)+". This regular expression, in theory, should capture a string of "a"s of any length. However, the way it is written includes an internal group of "a"s that can itself be repeated any number of times. Therefore when scanning an input string, e.g. "aab", the first "a" must be part of the group "(a+)", however, the second "a" could be part of the group "(a+)" or it could be a repetition of the first group if the first group only contains the first "a". This ambiguity leads to the regular expression engine to investigate both possibilities. By increasing the length of the input, e g "aaaaaaaaaaab", the regular expression engine will have to take exponentially many possible paths in analyzing the regular expression as there are "a"s in the string. En masse, this computational complexity can lead to regular expression engines taking an unacceptable amount of time to analyze a regular expression, constituting a ReDoS attack to that regex engine. In such examples, the portion of the attack string that causes this ambiguity is defined as "vulnerable." From the example above, the string "a" is vulnerable, as the complexity for analyzing the string "aaa . . . aaab" is exponential in the number of "a"s.

Since regular expressions can be a point of vulnerability open to network traffic, there is significant interest in analyzing regular expressions for ReDoS vulnerabilities. While the formation of a RegEx adheres to a fairly rigid set of rules for precisely defining acceptable strings, they nonetheless appear quite cryptic to a casual observer. While a human may be able to identify that "(a+)+" suffers from a ReDoS vulnerability, it is not immediately obvious for more complicated regular expressions such as:

"^([a-zA-Z0-9])(([\-.]|[_]+)?([a-zA-Z0-9]+))*(@){1}[a-z0-9]+[.]{1}(([a-z]{2,3})|([a-z]{2,3}[.]{1}[a-z]{2,3}))$"

Which is a a real-world regex used for email address validation. Notably, popular regular expression engines contain no protections from users accidentally introducing a ReDoS-vulnerable regular expression into their applications.

FIG. 1 is a context diagram of an information processing environment suitable for use with configurations herein. Referring to FIG. 1, an information processing system 100 includes a host or server computer 110, possibly clustered networked with other host or server computers 110-N, and having a connection 112 to a network 114 or similar arrangement through which an input string 120 may be received. The network 114 may be any suitable public or private access network such as the Internet, a local intranet, private LAN (Local Area Network), Wide Area Network (WAN), VPN (Virtual Private Network) or any of a number of interconnections available via conventional networking approaches. The network is typically accessible via one or more network devices 122-1 . . . 122-3 (122 generally) such as laptops, tablets, smartphones, desktop or stationary computers, and various other CPU based information devices having an ability to generate and/or transmit the input string 120 for evaluation.

Computability theorists describe the computability of a program or segment to arrive at a result based on a number of input elements n, and a computability measure increasing substantially, such as by a power of the number of input elements rapidly becomes intractable.

While the simplicity and elegance of the bubble sort is appealing, and useful to illustrate introductory programmed logic, it is easy to see that the approach becomes computationally infeasible with anything other than a small number of elements, as sorting involves n*n iterations through the list. While not an infinite loop, the termination condition of n*n iterations is impractical because it monopolizes the processor, and is tantamount to the processing demands imposed by a ReDoS attack by effectively disabling the executing processor/computer.

Abundant research exists in the field of computability which approaches algorithms based on the resulting processor burden in terms of the number of instructions executed. An algorithm that take n^2 work to complete is called quadratic, while an algorithm that take 2^n work is called exponential. There are other nuances, however in the general scope of a denial of service attack intended to consume processor resources, a detected execution path which increases in this manner can be deemed problematic. The vulnerable strings (and bubble sort) have quadratic computability, and hyper vulnerable strings have exponential computability. Any kind of recursive pattern is also in this suspect group.

Referring to the environment of FIG. 1, the disclosed method for assessing a regular expression for vulnerability to ReDoS attacks includes receiving or defining a regular expression 150, such that the regular expression 150 is for evaluating an input string 120 defined by ordered set of characters from an alphanumeric input device 122. During normal operation, the input string 120, which may be a password, filename or command, is evaluated by an application 140-1 . . . 140-N (140 generally) according to the regular expression 150. Based on the result of evaluation, an acceptance result 142 or denial result 144 is sent to the originating device 122. In the case where the input string 120 is a ReDoS attack string, however, in parsing the input string 120 based on the regex, control would be effectively usurped as the RegEx processing consumes the instruction cycles of the CPU 114.

Prior to RegEx processing, however, a RegEx processor 130 evaluates the regular expression 150 for determining if a parsing operation of the input string 120 according to the regular expression 150 results in a disproportionate resource consumption. The RegEx processor 130 determines, based on the evaluation, if the resource consumption constitutes a ReDoS attack, and if so, renders an indication of a vulnerability 152 of the regular expression on an operator console 116 or similar interface such that the vulnerabilities may be addressed. It should be emphasized that the parsing and evaluation for ReDos vulnerability as defined herein occurs on the regular expression 150 itself, prior to parsing of the input string 120 based on the RegEx 150.

Figure 2A:
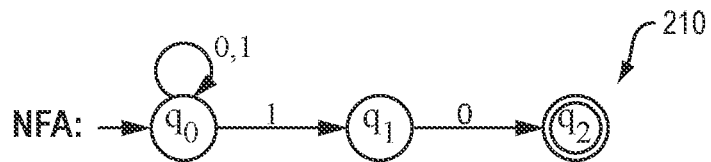
FIGS. 2A and 2B are examples of prior art processing resulting in ReDoS attacks that undermine the receiving host or server.
Figure 2B:
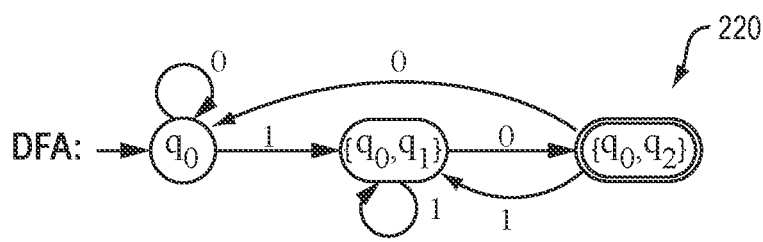

FIGS. 2A and 2B are examples of prior art processing resulting in ReDoS attacks that undermine the receiving host or server 110. There are several existing approaches to determine whether a given regular expression is vulnerable to a ReDoS attack, and to find strings that could trigger this vulnerability. Some approaches use dynamic analysis of the regular expression, generating potentially vulnerable strings and testing them against the regular expression engine. Other techniques involve static analysis, whereby assumptions are made regarding the abstractions used in the regular expression engine, and complexity is identified in those abstractions. Existing algorithms and tools however were often slow, and existing static analysis algorithms find all vulnerable strings, rather than a single exemplar. In most cases, it is only of interest whether the regex is vulnerable to ReDoS at all, not necessarily how many strings can be used to attack it.

Conventional approaches include a static ReDoS detection algorithm *Static Detection of DoS Vulnerabilities in Programs that use Regular Expressions* (Wüstholz, et al. (2017)). This algorithm identifies sub patterns within the regex and performs an analysis on whether those sub patterns may be vulnerable. It does so by utilizing a pair of abstractions for regular expressions called Non-deterministic Finite Automata (NFAs) and Deterministic Finite Automata (DFAs).

Referring to FIGS. 2A and 2B, a DFA is a finite-state machine (consisting of states and transitions between those states) in which each transition is uniquely determined by its source state and input symbol, and reading an input symbol is required for each state transition. Conversely, an NFA is again a finite-state machine, but does not require these two properties. For each input symbol in an NFA, it transitions to a new state until all input symbols have been consumed. Many regular expression engines are written using NFAs as a processing component.

FIGS. 2A and 2B illustrate an NFA 210 and DFA 220 representing the same regex: "[0,1]*10". The regex accepts on any string of "0"s and "1"s that ends in "10". Note that there is ambiguity in transitioning the top NFA (e.g. a self transition and a transition from q0 to q1 both labeled "1"). The corresponding DFA consists of many more transitions.

Both NFA and DFA representations of regular expressions have their drawbacks. Because NFAs do not have the uniqueness of transitions, they can contain ambiguity in state transitions. In fact, these ambiguities are precisely the cause of ReDoS. Alternatively, DFAs require unique transitions for every source state and input symbol. In some cases, this requires many more states than in the corresponding NFA. The tradeoff is that NFAs are smaller, but may be computationally inefficient at evaluation time, whereas DFAs are computationally efficient but may require a much larger memory footprint.

A challenge of conventional approaches to ReDoS vulnerability detection is that it requires constructing the intersection of two NFAs. There is no standard algorithm for performing this intersection, however, there is an algorithm for intersecting two DFAs. One can construct an NFA for a corresponding DFA and vice versa (as they can both be used as abstractions for the given regex). In order to construct the intersection of NFAs, one can first convert to DFAs, perform the intersection, and then transform back into NFAs. As mentioned above, the conversion to DFAs can require a significantly larger amount of memory compared to the original NFA for the given regex. In practice, it can be found that commonly used regular expressions, particularly those with "quadratic" ReDoS vulnerabilities require more memory to analyze than is available on a commodity PC. One may conclude that such an approach leads to an analysis where the "cure is worse than the disease."

In general, an NFA and DFA can be defined as a state graph to specify parsing logic. In tracing the analysis of the NFA 210 or DFA 220, it can be observed that a "self transition," that is, a state transition back to itself, denotes a potential vulnerability. A further indicator results from an ambiguous state transition, shown graphically as multiple paths with the same transition value from a state. By definition, this cannot occur with a DFA, but as will be seen below, indirect transitions leading back to a state can have a similar result.

One of the shortcomings of conventional approaches is that the NFA intersection operation can be so memory intensive that it is made impossible. The second is perhaps more subtle. The algorithm seeks to produce an NFA, which itself models all strings that produce ReDoS effects in the original regex. However, in conventional approaches, it is not possible to extract a single example ReDoS-inducing string without proceeding through the costly NFA intersection.

Configurations discussed below replace the costly NFA intersection computation step by implementing a solution to the RegEx by forming a logical equation, such as a Boolean satisfiability (SAT) problem. In SAT, one inquires whether a Boolean formula, a function with many $\{0,1\}$ valued inputs and a single $\{0,1\}$ valued output, has a satisfying assignment, namely one that will cause its output to be a 1. This is equivalent to asking if there is some assignment of $\{0, 1\}$ input values that will make a logical expression true. A logic engine responds to the formed logical equation problem. Such logic engines can be invoked to quickly finding solutions (or showing that no solution exists) to extremely large, complicated SAT problems. Examples of these logic engines include CaDiCal, MapleLCMDDistChronoBT-DL, and smallsat. Configurations herein for forming a logic equation may be applied to similar problems in mathematics, computer science, and electrical engineering. An extension to SAT is Satisfiable Modulo Theories (SMT), which provides for specialized solvers that augment the SAT in areas such as real, linear arithmetic, bit-vectors, lists, and strings. SMT solvers include CVC4, Z3, and yices.

In configurations herein, rather than constructing the NFA intersection through conventional measures, the RegEx processor 130 provides the logical description of that intersection to a logic engine adapted for solving SMT problems which computes one of three things: either it identifies a member of the intersection (SAT), identifies that no such member could possibly exist (UNSAT), or the computation reaches a set timeout.

Vulnerable structures in a candidate RegEx include vulnerable and hyper-vulnerable structures. Vulnerable structures are defined by quadratic complexity, where computability varies by the square of the number of elements, and hyper-vulnerable structures, where computability varies exponentially with the number of elements.

A summary of the processing steps is as follows:
  I. Ingest a given regular expression
  II. Identify and isolate potential "hyper-vulnerable" (potentially leading to exponential ReDoS) and potential "vulnerable" (potentially leading to quadratic ReDoS) sub patterns within the given regex by parsing a regex syntax tree.

III. For each isolated sub pattern type (hyper-vulnerable and vulnerable), enumerate over the identified examples, and execute SMT analysis to generate either:
   a. SAT. if an example vulnerable attack string is found,
   b. UNSAT, if no attack string exists,
   c. Timeout, if the logic engine fails to find, within a set amount of time, a string smaller than a certain specified length.
IV. If SAT for step III, parse the regex syntax tree to return a prefix for the vulnerable sub pattern, and traverse that regex (any traversal is fine) to obtain a valid prefix. The same is done to select a non-matching suffix (often can be taken to be the empty string). Appending this prefix and suffix to the vulnerable string found in step III will return an attack string for the original regex.

As an example, for the regex "helloworld(a+)+", the regex syntax tree would determine that the portion "(a+)+" has the proper syntax to potentially be a hyper-vulnerable regex, the SMT solver would determine that "a" is a vulnerable attack string for the sub pattern "(a+)+" and the regex syntax tree would recover that "helloworld" is a valid prefix leading into that sub pattern. Thus a hyper-vulnerable attack string for the regex "helloworld(a+)+" would be "helloworldaaaaaaaaaaa" or similar.

Figure 3:
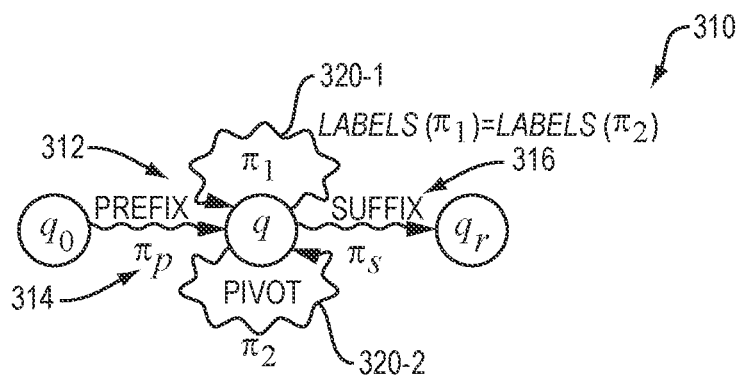
FIG. 3 is an example of a hyper-vulnerable NFA structure detected by the proposed approach.

FIG. 3 is an example of a hyper-vulnerable NFA structure detected by the proposed approach. Referring to FIG. 3, a hyper-vulnerable NFA 310 (i.e. exponential run-time in the number of repetitions of the vulnerable string) regex is detectable by the disclosed approach. The regex processor 130 determines, for loop constructs defined by a loop within a loop, if each loop has a self transition and is the transition labels correspond to a common value. This presents a construct ripe for exploitation as a hyper-vulnerable construct.

A sub pattern of interest 312 lies in the pivot state "q" with the two self-transitions 320-1, 320-2. In contrast to conventional approaches, a prefix 314 and suffix 316 are not necessary for Step II, but a valid prefix will be recovered in Step IV. A requirement for this sub pattern is that there are two self-transitions 320-1, 320-2 to state q, where the transition labels π1 and π2 match. That the labels match may not be immediately clear from the regular expression, which is why Step III is significant. Therefore, for Step II above, we consider any pair of self-transitions within the regular expression. These self-transitions manifest most commonly in regex as the Kleene star operator "*" or the "+" operator (and so can be directly parsed from the regex syntax tree).

Figure 4:
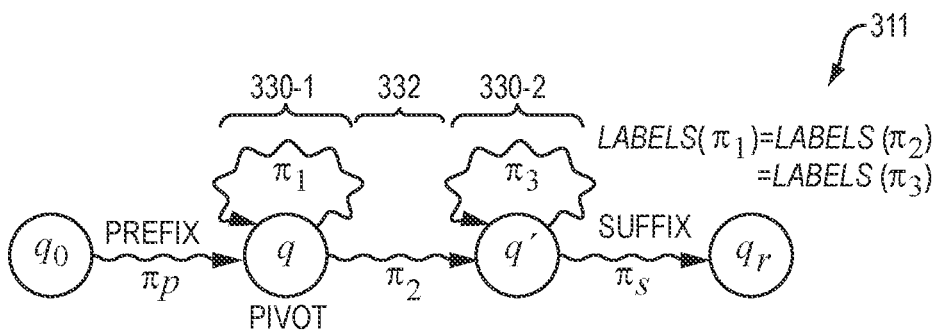
FIG. 4 is an example of a vulnerable NFA structure detected by the proposed approach.

FIG. 4 is an example of a vulnerable NFA structure 311 detected by the proposed approach. Referring to FIG. 4, a pair of loops connected by a bridge transition presents a similar looping ambiguity. In FIG. 4, the regex processor 130 determines, for loop constructs defined by three loop constructs including a first loop 330-1, transition 332 and second loop 330-2, if a string exists that satisfies transitions to all three loop constructs. Identifying a loop construct further concluding a self transition from the state to itself based on an input character.

FIG. 4 shows the generic NFA structure for a vulnerable (i.e. quadratic runtime in the repetitions of the vulnerable string) regex. Similarly, the sub pattern of interest lies in states "q" and "q', together with the transitions 1, 2 and 3. In this case, Step II will decide whether a string exists that satisfies all three transitions. Put another way, the strings may be represented by syntax trees, discussed further below. Both "loop" self-transitions 330 can be determined from syntax tree loops, and the "bridge" transition 332 can be directly verified in the regex syntax tree.

In contrast to conventional approaches, formation of a logic equation in step III departs from conventional approaches of detection hyper-vulnerable and vulnerable sub patterns for constructing an "attack NFA", the construction of which can be prohibitively memory inefficient. Instead of constructing this large NFA, the formed logic equation instantiates the sub pattern as a set of SMT constraints in an SMT string. Then the SMT solver can identify whether a solution to those constraints exists.

The logic equation follows an established syntax, just as many computer languages and parseable contexts, for parsing according to the rules of the syntax. An example of SMT syntax is illustrated in Table I. Other logic equation mechanisms may also be employed.

TABLE I (set-logic QF_S)
(declare-fun x ( ) String)
(assert (str.in.re x (re.union (re.++ (re.* (str.to.re "\x61") ) (re.* (str.to.re "\x62") ) (re.* (str.to.re "\x63") ) ) (re.++ (re.* (re.union (re.++ (str.to.re "\x61") (str.to.re "\x61") ) ) ) (re.* (re.union (re.++ (str.to.re "\x62") (str.to.re "\x62") ) ) ) (re.* (str.to.re "\x63") ) ) (re.union (re.++ (re.union (re.++ (re.+ (str.to.re "\x64") ) (re.+ (str.to.re "\x65") ) ) ) ) (re.++ (re.union (re.++ (re.+ (str.to.re "\x66") ) ) ) (re.union (re.++ (re.union (re.++ (re.loop (str.to.re "\x67") 2) ) ) ) (re.++ (str.to.re "\x6a") ) ) (re.+ (str.to.re "\x65") ) ) (re.union (re.++ (re.+ (str.to.re "\x68") ) ) (re.++ (re.+ (str.to.re "\x69") ) ) ) ) ) ) ) )))
(assert (str.in.re x (re.union (re.++ (re.* (str.to.re "\x61") ) (re.* (str.to.re "\x62") ) (re.* (str.to.re "\x63") ) ) )))
(assert (str.in.re x (re.union (re.++ (str.to.re "\x61") (str.to.re "\x62") (str.to.re "\x63") ) )))
(check-sat)
(get-model)

The logic equation allows evaluation of only the loop constructs defined by the self-transition states q and q'. Part of the severity in a ReDoS attack is determined by the compactness of the vulnerable portion of the attack string. For example, if a ReDoS vulnerability exists in a text field of 100 characters, and the "vulnerable" sub pattern of the regex is a single character, then the regex engine may need to investigate 2^100 paths. For this reason, the above approach ignores the prefix 314 and suffix 316 portions of the string, If the vulnerable sub pattern is 10 characters, however, then at most the regex engine will need to investigate 2^10 paths, since the sub pattern can only be repeated 10 times within the allowed space. Because of this, it makes sense in most use cases to focus only on whether there exist ReDoS vulnerabilities wherein the vulnerable string is "short". Certainly, a shorter vulnerable string will cause a larger effect when considering two attack strings of the same length. In this way, the SMT approach is quite natural, the SMT solver prioritizes shorter examples and expands outwards. The timeout can be set so that the strategy gives up after examining all strings up to a certain length, for example a length limit set on a password string.

In contrast to conventional approaches, the disclosed logic equation is not memory constrained, and an integrated timeout prevents it from being time constrained as well, while not sacrificing detection of severe ReDoS strings.

The suspect constructs become well defined in a syntax tree, or parse tree, representation. This is a hierarchical representation of the regex 150. The regex processor 130 generates a syntax tree based on the regular expression 150, and traverses the syntax tree for identifying the loop constructs 320, 330, 332. If a traversal of the syntax tree from the identified loop leads to a loop in a child node (therefore denoting a nested loop), a suspect constraint defined by a double nested loop is established. Alternatively, if a traversal from the identified loop for identifying a sibling node detects a loop, then a bridged loop is defined. Evaluating a syntax tree based on the valid attack string can be performed without traversing all paths of the syntax tree for determining a plurality of valid attack strings, as only a single valid attack string need be found to identify a ReDoS vulnerability. In other words, logic engine 650 (discussed below) identifies and returning a valid attack string before performing an evaluation or traverse for identifying a second or successive valid attack strings.

Figure 5:
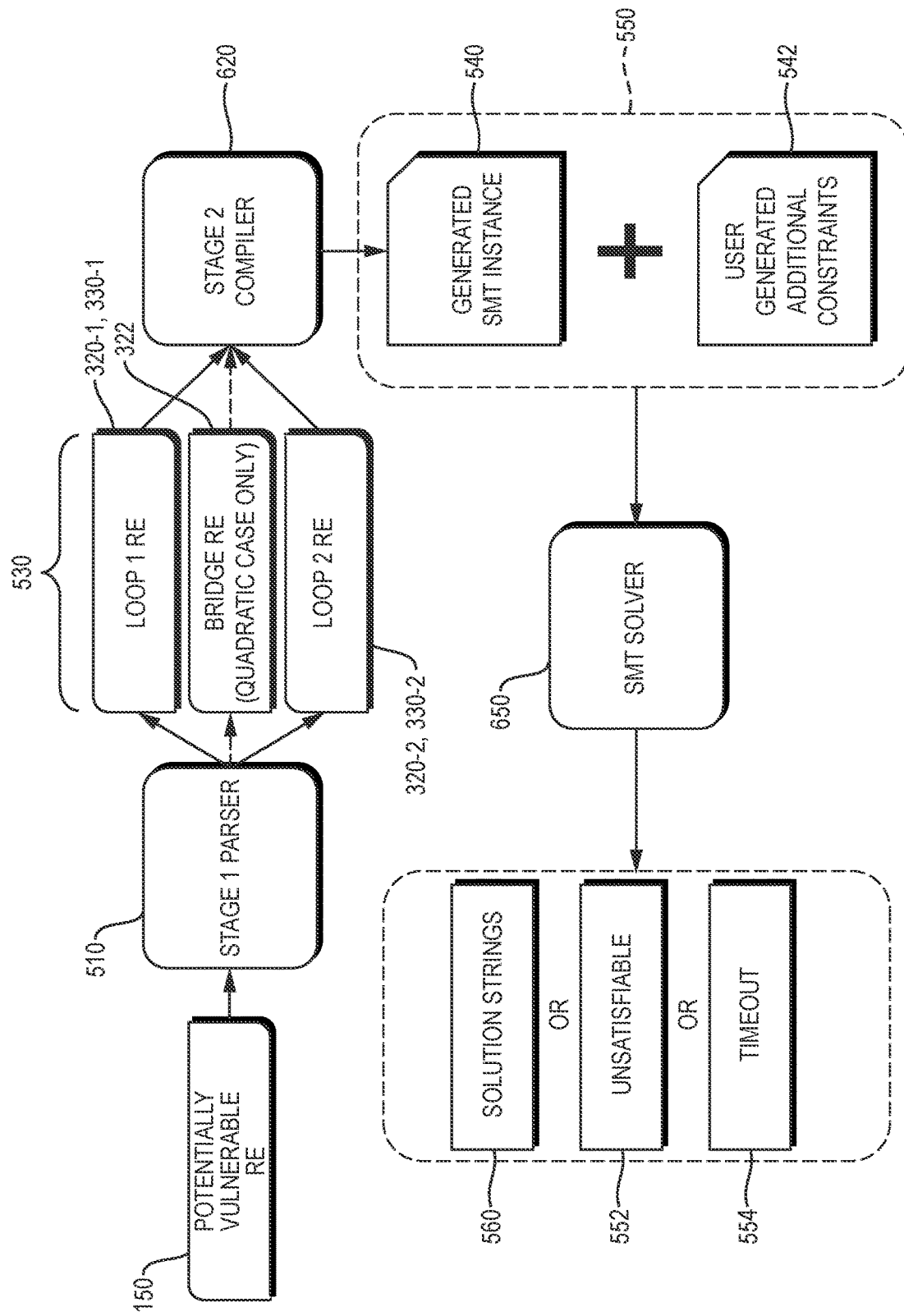
FIG. 5 is a data flow diagram of RegEx processing in the environment of FIG. 1.
Figures 6, 7:
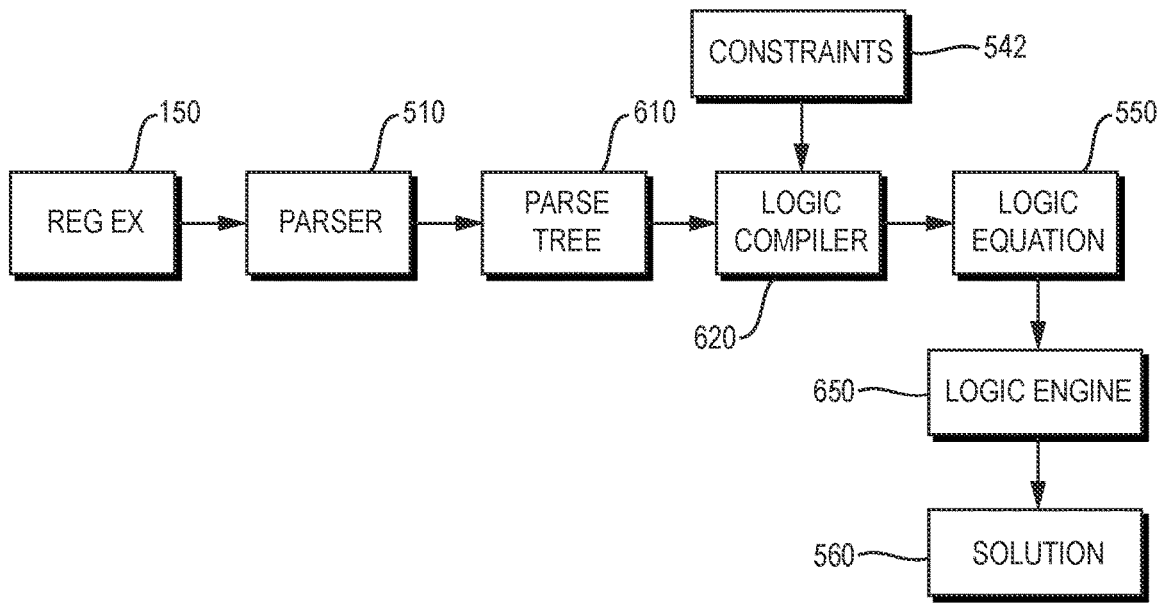
FIG. 6 is a schematic diagram of RegEx processing for detecting a vulnerable or hyper-vulnerable construct in the RegEx.
FIG. 7 is an example of a RegEx detecting a vulnerable structure using the approach depicted in FIGS. 3-6.

FIG. 5 is a data flow diagram of RegEx processing in the environment of FIG. 1, and FIG. 6 is a corresponding data flow. Referring to FIGS. 3-6, a potentially vulnerable regular expression 150 is first parsed, using parser 510, into its parse (syntsc) tree 610 denoting the suspect components. Three portions of the regex (330-1, 332, and 330-2) may be identified in this as potentially representing the "vulnerable" sub pattern, and two (320-1, 320-2) in the case of the "hyper-vulnerable" sub pattern. These are then compiled into a logic equation 550. In both cases, the prefix 314 and suffix 316 are denoted as not suspect since there are no self transitions and/or duplicate transition values. Either the prefix or the suffix may also be null.

Characters that do not trigger looping in the RegEx may occupy a prefix of the attack string. The prefix defines a sequence of characters in the string that satisfies the regular expression, and precede the characters denoting the loop constructs.

The logic compiler 620 therefore forms a logic expression 550 based on an intersection of the loop constructs in the regular expression 150. Since different logic engines may have a particular syntax, the compiler 620 identifies a syntax of a logic engine 650 responsive to the logic expression 550. The compiler encodes the logic expression 550 as a set of constraints, such that each loop construct 530 defines a constraint in the logic expression 550, and in a syntax based on the logic engine 650. The regex processor 130 then invokes the logic engine 650 for concluding either: a string satisfying each of the constraints; or an indication that no such string can be found.

The logic engine 650 may employ SMT (SAT Modulo Theories) solvers, an approach to compute solutions to logic based problems in fields such as computer science and engineering. SMT is an extension of the classical problem of Boolean satisfiability, often abbreviated SAT. SAT asks the following question: Given a set of formulae which can only take 0 or 1 as inputs and have 0 or 1 as an output, is there some assignment of inputs which can actually make the output a 1? We often interpret 0 to represent "false" and 1 to represent "true." The operations on variables in these formulae are usually interpreted as the classical logical operations of "and," "or," and "not."

Example of SAT: The Boolean formula $(x \lor y) \land z$, which one could read as "one of x or y is true, and z is true," is satisfiable by the assignment x=1, y=0, z=1. The Boolean formula $(x \lor y) \land \overline{x} \land \overline{y}$, which one could read as "one of x or y is true and the negation of x is true and the negation of y is true," cannot be satisfied by any assignment of 0 or 1 to x and y. We call formulas like the latter "unsatisfiable" or UNSAT.

A logic expression compiler 620 reads each expression and translates it to an SMT instance 540 that describes it as a set of constraints 530. The encoding of the SMT problem can be chosen to be in either the internal language of specific logic engines, like Z3 or CVC4, or it can be made generically in the SMT2-LIB format. The logic equation 550 including the compiled instance 540 and additional constraints 542 (i.e. max length of vulnerable string) are fed into the logic engine 650, which generates either a solution string (or set of strings), UNSAT or a timeout. The logic compiler 620 then forms a conjunction 540 of the generated constraints 530, and passes these to the logic engine 650, depicted as an SMT solver in the disclosed approach. Using the SMT solver's back-end string theory, it will generate one of three results: a satisfying solution 560 of a string that would induce a ReDoS attack, a statement that no solution exists 552, meaning that the a ReDoS attack will not succeed, or a timeout 554. Additional constraints 542, such as length of the solution, can be added by the tool to only generate ones that are appropriate. Additional constraints can increase the runtime required for the SMT solver.

The use of additional constraints 542 bounds the logic expression and is particularly useful to limit evaluation to a known string length. In the case of a maximum input string 120 length, such as for limiting a password or filename, constraints may identify a string length limit for which the analysis concludes, and encode the length limit as a constraint.

For each of the identified loop constructs, the logic compiler 620 generates a logic equation representation of the loop construct and solves the logic equation to identify a satisfying string expression as a solution to the logic equation. The logic engine 650 returns the satisfying string expression as the indication of vulnerability of the regular expression, or, if no satisfying expression is returned by the SMT analysis, returns that no indication of vulnerability exists.

FIG. 7 is an example of a RegEx detecting a vulnerable structure using the approach depicted in FIGS. 3-6. Referring to FIGS. 3-7, the RegEx processor 150 examines the regular expression 750, which was originally designed to check for valid email addresses. The RegEx processor 130 deconstructs the potentially exponential ReDoS attack from the nested loop components: 720-1 and 720-2, based on the syntax rules of the RegEx.

Figure 8:
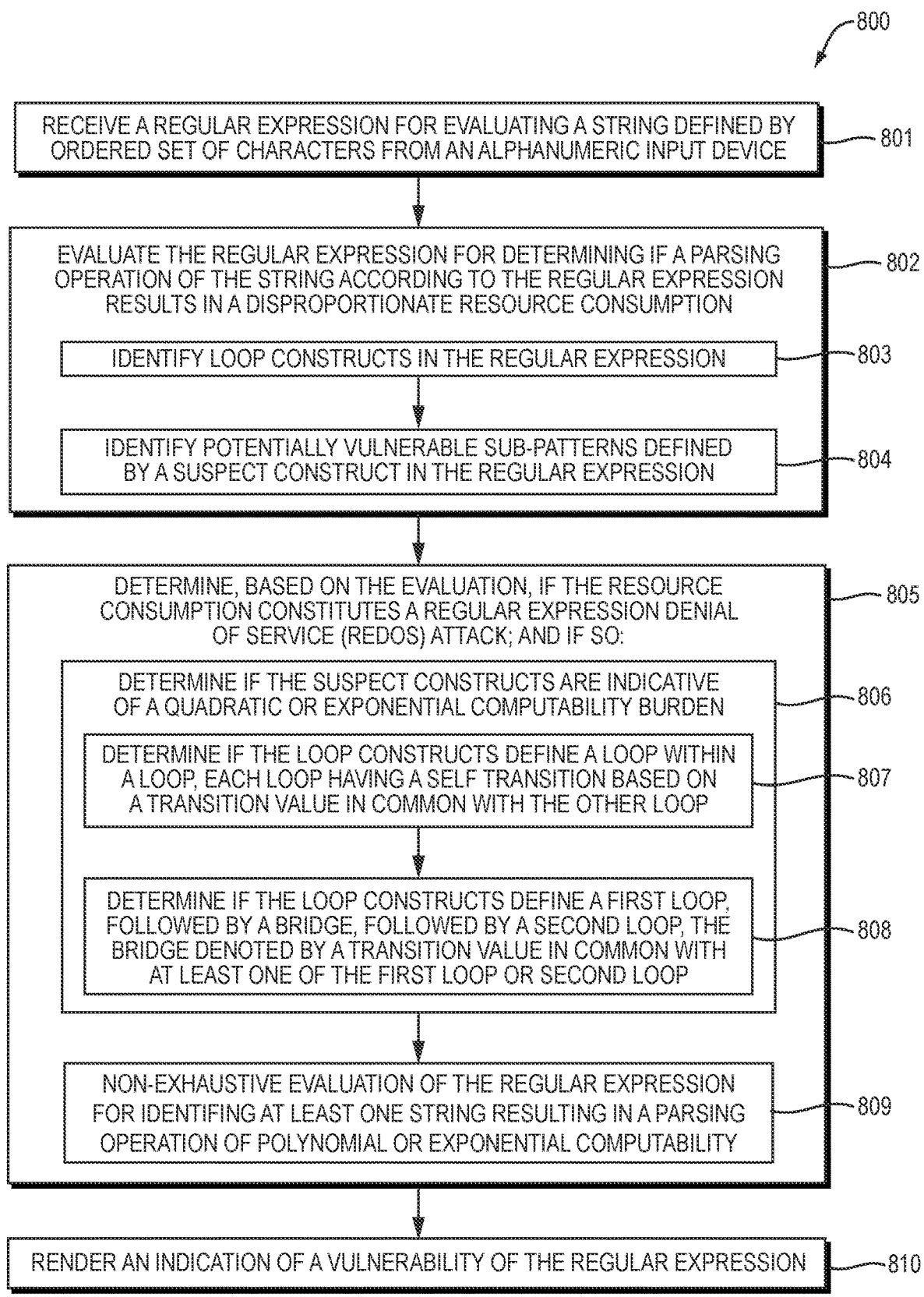
FIG. 8 is a flowchart of ReDoS detection as in FIG. 7.

FIG. 8 is a flowchart 800 of ReDoS detection as in FIG. 7. Referring to FIGS. 1-8, at step 801, the method for assessing a regular expression 150 for vulnerability to ReDoS attacks includes receiving a regular expression 150, such that the regular expression is for evaluating an input string 120 defined by ordered set of characters from an alphanumeric input device. The RegEx processor 130 evaluates the regular expression for determining if a parsing operation of the string 120 according to the regular expression 150 results in a disproportionate resource consumption, as shown at step 802. Evaluating further includes identifying loop constructs in the regular expression, as depicted at step 803, and from the loop constructs, identifying potentially vulnerable sub-patterns defined by a suspect construct in the regular expression 150, as disclosed at step 804. Vulnerable structures include loop patterns having a self-transition which could result in a cyclic or recursive parsing.

The logic engine 650 determines, based on the evaluation, if the resource consumption constitutes a ReDoS attack depicted at step 805. Constructs designating a ReDoS attack include constructs are indicative of a quadratic or exponential computability burden, detected at step 806. This includes determining if the loop constructs define a loop within a loop, in which each loop has a self transition based on a transition value in common with the other loop, as depicted at step 807. Alternatively, the loop constructs may define a first loop, followed by a bridge, followed by a second loop, in which the bridge is denoted by a transition value in common with at least one of the first loop or second loops, as shown at step 808. In both cases, the suspect loop constructs defined by the logic expression result from a non-exhaustive evaluation of the regular expression for identifying at least one string resulting in a parsing operation of quadratic or exponential computability, as depicted at step 809. In other words, parsing and traversal of the RegEx 150 does not exhaustively generate all possible strings that may satisfy the RegEx 150. All that is needed is at least one example string 120 that satisfies the logic expression to indicate that the RegEx is potentially vulnerable. If the logic expression cannot be satisfied, then it is concluded that there is no input string 150 defining an evaluation path that causes a runaway computation of quadratic or exponential computability, i.e. a ReDoS attack, The regex processor 120 then rendering an indication of a vulnerability of the regular expression, as disclosed at step 810.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for assessing a regular expression for vulnerability to ReDoS attacks, comprising:
   receiving a regular expression, the regular expression for evaluating a string defined by an ordered set of characters from an alphanumeric input device;
   evaluating the regular expression for determining if a parsing operation of the string according to the regular expression results in a disproportionate resource consumption, evaluating further comprising:
   identifying loop constructs in the regular expression;
   determining if the loop constructs define a loop within a loop, each loop having a self transition based on a transition value in common with the other loop; or
   determining if the loop constructs define a first loop, followed by a bridge, followed by a second loop, the bridge denoted by a transition value in common with at least one of the first loop or second loops, further comprising, for each of the identified loop constructs:
   generating a logic equation representation of the loop construct; solving the logic equation to identify a satisfying string expression;
   returning the satisfying string expression as an indication of vulnerability of the regular expression, or
   if no satisfying expression is returned by an SMT (Satisfiable Modulo Theories) analysis, return that no indication of vulnerability exists;
   determining, based on the evaluation, if the resource consumption constitutes a Regular Expression Denial of Service (ReDoS) attack; and if so,
   rendering the indication of vulnerability of the regular expression.

2. The method of claim 1 wherein evaluating further comprises:
   identifying potentially vulnerable sub-patterns defined by suspect constructs in the regular expression; and
   determining if the suspect constructs are indicative of a quadratic or exponential computability burden.

3. The method of claim 1 further comprising a non-exhaustive evaluation of the regular expression for identifying at least one string resulting in a parsing operation of quadratic or exponential computability.

4. The method of claim 1 further comprising:
   generating a syntax tree based on the regular expression;
   traversing the syntax tree for identifying the loop constructs; and
   traversing the syntax tree from the identified loop for identifying a loop in a child node denoting a nested loop; and
   traversing the syntax tree from the identified loop for identifying a sibling node denoting a bridged loop.

5. The method of claim 4 wherein identifying a loop construct further comprises determining a state represented by a node in the syntax tree, and concluding a self transition from the state to itself based on an input character.

6. The method of claim 4 wherein the indication of vulnerability is a valid attack string, the valid attack string defined by string for which evaluation based on the regular expression would result in disproportionate resource consumption, further comprising identifying the valid attack string prior to performing an exhaustive traversal of potential attack strings.

7. The method of claim 6 further comprising evaluating a syntax tree based on the valid attack string before traversing all paths of the syntax tree for determining a plurality of valid attack strings.

8. The method of claim 7 further comprising identifying and returning a valid attack string before performing the traverse for identifying a second valid attack string.

9. The method of claim 1 further comprising:
   determining, for loop constructs defined by a loop within a loop, if each loop has a self transition and the transition labels correspond to a common value.

10. The method of claim 1 further comprising:
    forming a logic expression based on an intersection of the loop constructs in the regular expression,
    identifying a syntax of a logic engine responsive to the logic expression;
    encoding the logic expression as a set of constraints, each loop construct defining a constraint in the logic expression, in a syntax based on the logic engine; and
    invoking the logic engine for concluding either:
    a string satisfying each of the constraints; or
    an indication that no such string can be found.

11. The method of claim 10 further comprising identifying a string length limit for the logic engine invocation indicative of a maximum or minimum string length for which the analysis concludes; and encoding the length limit as a constraint, the constraint based on a maximum number of characters from which an attack string may be formed.

12. The method of claim 10 further comprising identifying a prefix of the regular expression, the prefix defining a sequence of characters in the string that:

satisfy the regular expression; and precede the characters denoting the loop constructs.

13. A method for assessing a regular expression for vulnerability to ReDoS attacks, comprising:

receiving a regular expression, the regular expression for evaluating a string defined by an ordered set of characters from an alphanumeric input device;

evaluating the regular expression for determining if a parsing operation of the string according to the regular expression results in a disproportionate resource consumption, evaluating further comprising:

identifying loop constructs in the regular expression;

determining if the loop constructs define a first loop, followed by a bridge, followed by a second loop, the bridge denoted by a transition value in common with at least one of the first loop or second loops; and determining, for the loop constructs defined by three loop constructs including a first loop, transition and second loop, if a string exists that satisfies transitions to all three loop constructs;

determining, based on the evaluation, if the resource consumption constitutes a Regular Expression Denial of Service (ReDoS) attack; and if so, rendering an indication of a vulnerability of the regular expression.

14. A computing device for assessing a regular expression for vulnerability to ReDoS attacks, comprising:

a network interface for receiving a regular expression, the regular expression for evaluating a string defined by an ordered set of characters from an alphanumeric input device;

a regular expression processor for evaluating the regular expression for determining if a parsing operation of the string according to the regular expression results in a disproportionate resource consumption;

an interface to a logic engine, the logic engine responsive to a logic equation computed from the regular expression for:

evaluating the regular expression for determining if a parsing operation of the string according to the regular expression results in a disproportionate resource consumption based on a looping construct of a plurality of looping constructs having a transition value in common with another of the plurality of looping constructs; and determining, based on the evaluation, if the resource consumption constitutes a Regular Expression Denial of Service (ReDoS) attack; and if so, a user interface responsive to the determination for rendering an indication of a vulnerability of the regular expression.

15. The device of claim 14 wherein evaluating further comprises:

identifying potentially vulnerable sub-patterns defined by suspect constructs in the regular expression; and determining if the suspect constructs are indicative of a quadratic or exponential computability burden.

16. The device of claim 14 wherein the regular expression processor has a parser for performing a non-exhaustive traversal of the regular expression for identifying at least one string resulting in a parsing operation of quadratic or exponential computability.

17. The device of claim 14 wherein the regular expression processor is further configured to:

identify loop constructs in the regular expression;

determine if the loop constructs define a loop within a loop, each loop having a self transition based on a transition value in common with the other loop; or determine if the loop constructs define a first loop, followed by a bridge, followed by a second loop, the bridge denoted by a transition value in common with at least one of the first loop or second loops.

18. A method for evaluating an input string for ReDos attacks, comprising:

receiving a string defined by an ordered set of characters from an alphanumeric input device;

evaluating the string for determining if a parsing operation of the string results in a disproportionate resource consumption, evaluating further comprising:

identifying loop constructs in a regular expression;

forming a logic expression based on an intersection of the loop constructs in the regular expression;

identifying a syntax of a logic engine responsive to the logic expression;

encoding the logic expression as a set of constraints, each loop construct defining a constraint in the logic expression, in a syntax based on the logic engine; and determining if the loop constructs define a loop within a loop, each loop having a self transition based on a transition value in common with the other loop; or determining if the loop constructs define a first loop, followed by a bridge, followed by a second loop, the bridge denoted by a transition value in common with at least one of the first loop or second loops;

determining, based on the evaluation, if the resource consumption constitutes a Regular Expression Denial of Service (ReDoS) attack, including invoking the logic engine for concluding either:

a string satisfying each of the constraints; or an indication that no such string can be found; and rejecting the received string prior to parsing.

* * * * *